United States Patent [19]

Lawson

[11] Patent Number: 5,365,309
[45] Date of Patent: Nov. 15, 1994

[54] EXPOSURE FRAME ASSEMBLY

[75] Inventor: Allen A. Lawson, Coon Rapids, Minn.

[73] Assignee: Colight, A Division of Hanovia Lamp, Minneapolis, Minn.

[21] Appl. No.: 107,538

[22] Filed: Aug. 17, 1993

[51] Int. Cl.⁵ .......................... G03B 27/62
[52] U.S. Cl. ...................... 355/75; 355/231
[58] Field of Search ............. 355/231, 75, 76, 118, 355/128–130

[56] References Cited

U.S. PATENT DOCUMENTS

| | | | |
|---|---|---|---|
| 3,352,222 | 11/1967 | Salger | 95/73 |
| 3,479,121 | 11/1969 | Burgess | 355/85 |
| 4,010,882 | 3/1977 | Turner | 355/75 X |
| 4,190,359 | 2/1980 | Murayama et al. | 355/75 |
| 4,429,989 | 2/1984 | Yoshimura et al. | 355/76 |
| 4,439,036 | 3/1984 | Davis et al. | 355/75 |
| 4,449,811 | 5/1984 | Betron et al. | 355/75 X |
| 4,641,947 | 2/1987 | Ishida et al. | 355/75 X |
| 4,677,303 | 6/1987 | Erdman | 250/561 |
| 4,714,947 | 12/1987 | Nishida et al. | 355/95 |
| 4,764,788 | 8/1988 | Watashi et al. | 355/75 X |
| 4,888,488 | 12/1989 | Miyake | 250/492 |
| 4,903,075 | 2/1990 | Kinoshita | 355/94 |
| 4,989,035 | 1/1991 | Leonhart | 355/93 |
| 5,128,713 | 7/1992 | Watanabe | 355/75 |
| 5,177,535 | 1/1993 | Watanabe | 355/230 |

*Primary Examiner*—Richard A. Wintercorn
*Attorney, Agent, or Firm*—Merchant, Gould, Smith, Edell, Welter & Schmidt

[57] ABSTRACT

A exposure frame assembly for use with a contact and off contact photo exposure machine which includes a removable upper tray frame coupled to a lower tray frame. In use, a pair of pneumatically operated rams capture hinge pivot rollers mounted on the upper tray frame and actuate a pair of tray lift rollers which are also attached to the upper tray frame. In operation, the motion of the pneumatic ram act on the tray lift rollers to open the exposure frame assembly for access to the work-piece.

6 Claims, 3 Drawing Sheets

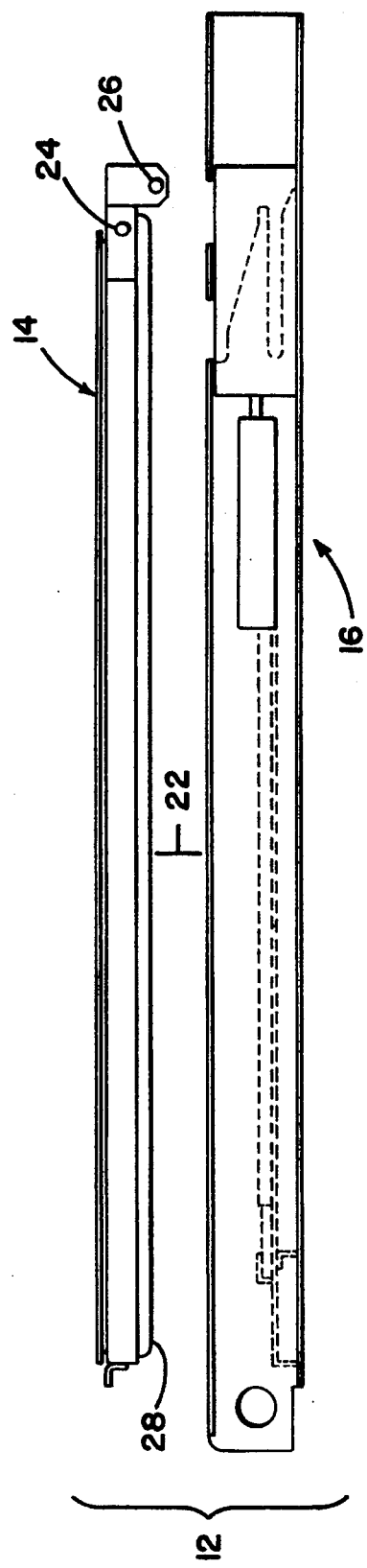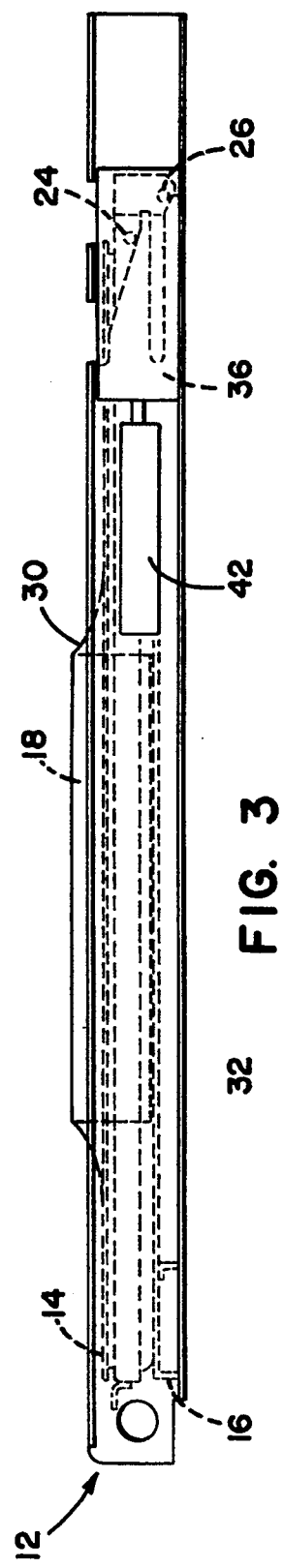

EXPOSURE FRAME ASSEMBLY

TECHNICAL FIELD

The present invention relates to an exposure frame assembly for use with a contact and off contact photo exposure machines.

BACKGROUND ART

Contact and off contact photo exposure machines are used to expose photosensitized work-pieces for a variety of industrial purposes. In general, an exposure frame assembly is used by the machine operator to introduce a photosensitized work-piece and associated artwork into the exposure machine. In use, the operator loads work-piece into the exposure frame assembly. Next the exposure frame assembly moves the work-piece into the exposure zone of the exposure machine. After completion of the exposure process, the exposure machine returns the exposure frame assembly to the operator. The operator then opens the exposure frame assembly, removes the exposed work-piece and reloads the exposure frame assembly for the next operating cycle.

Conventional exposure frames such as that taught by U.S. Pat. No. 3,479,121 are opened manually by the operator, which is inconvenient and which limits system throughput.

SUMMARY DISCLOSURE OF INVENTION

To maximize system throughput, it is preferred to include two exposure frame assemblies of the type taught by the present invention in a single contact and off contact photo exposure machine. In use, one exposure frame assembly is in the "load" position while the companion exposure frame assembly is in the exposure zone of the machine. Only one of these two identical exposure frame assemblies is described in detail.

The exposure frame assembly includes a stationary lower tray frame and a movable upper tray frame. A pair of tray lift hinge pivot rollers are attached to the upper tray frame and these two rollers define a hinge pivot axis. The movable upper tray frame rotates about this hinge axis to "open" the frame assembly. A pneumatically operated ram structure sequentially, traps the pair of tray lift hinge pivot rollers and interacts with a complimentary pair of tray lift rollers to open the exposure frame assembly.

The operator initiates tray opening through a pneumatic control system. The pneumatic operation also provides enhanced operator safety since the pneumatic ram which opens the exposure frame can be easily overpowered by the operator. This pneumatic ram structure also permits the movable upper tray frame to be readily removed from the lower tray frame for cleaning and the like.

BRIEF DESCRIPTION OF THE DRAWINGS

An illustrative and exemplary exposure frame assembly is shown in the accompanying drawings, wherein like reference numerals refer to identical structure throughout and in which:

FIG. 2 is a cross-section view of the exposure frame assembly;

FIG. 3 is a cross-section view of the exposure frame assembly;

DETAILED DESCRIPTION OF THE ILLUSTRATIVE EMBODIMENT

Figure 1:
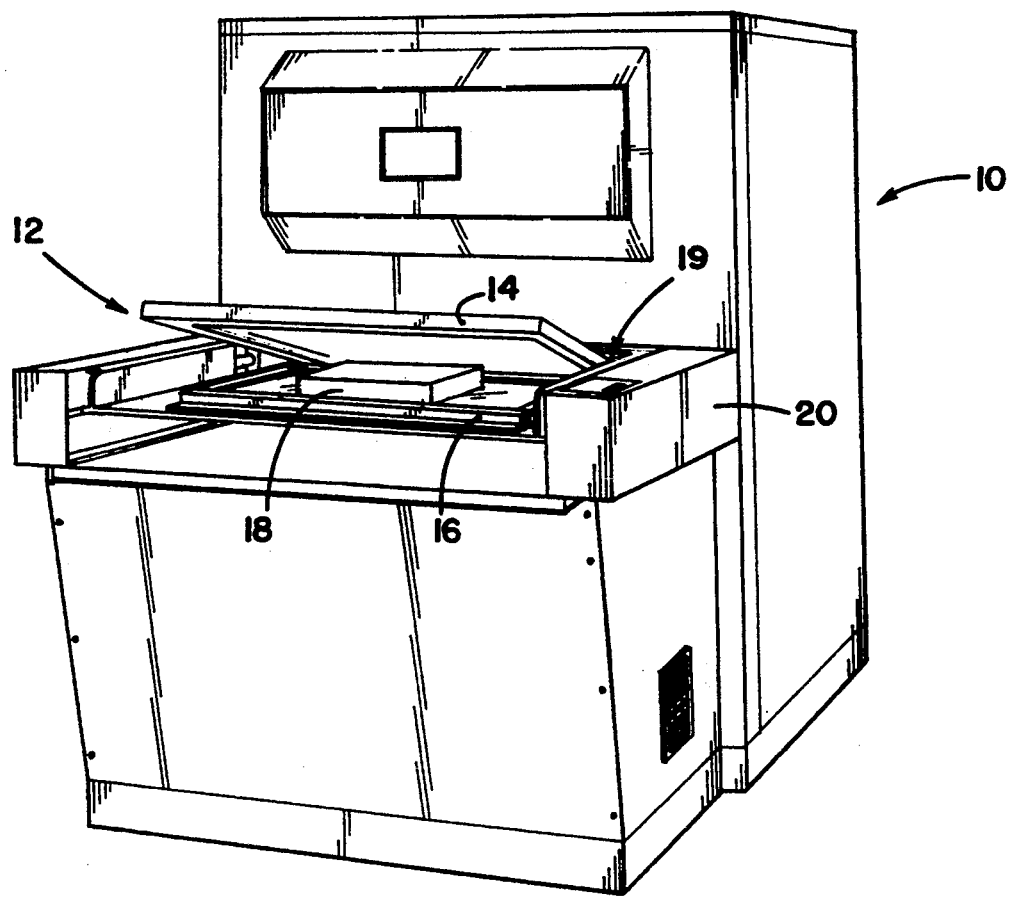
FIG. 1 is a perspective view of a contact and off contact photo exposure unit.

FIG. 1 is a perspective view of a representative but not limiting contact and off contact photo exposure machine 10, which includes two exposure frame assemblies, one of which is shown in the "open" position. The exposure frame assembly 12 includes an upper tray frame 14 and a lower tray frame 16. In FIG.1 the exposure frame assembly 12 is open permitting the operator to insert a work-piece 18 into the exposure frame assembly 12 by placing the work-piece 18 onto the transparent surface of the lower tray frame 16.

Next, the operator will activate an appropriate control to close the exposure frame assembly 12. Pneumatic power is supplied to permit the upper tray frame 14 to move into abutment with the lower tray frame 16. When the exposure frame assembly 12 is closed, a vacuum is drawn to clamp the work-piece 18 between the upper tray frame 14 and the lower tray frame 16. Next, the exposure frame assembly 12 may be rolled into the opening 19 in the exposure machine housing 20. At this time a companion exposure frame assembly may be rolled out of the complimentary opening in the exposure system housing 20.

Figure 4:
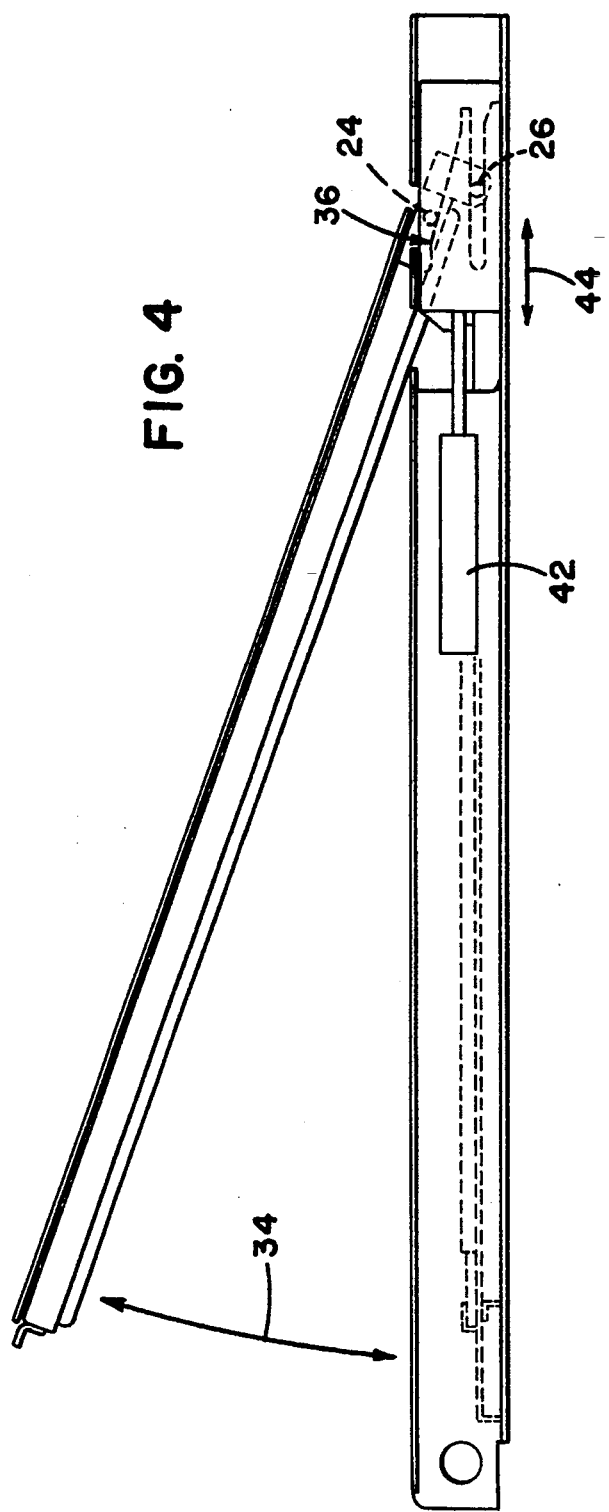
FIG. 4 is a cross-section view of the exposure frame assembly.

FIG. 2, FIG. 3 and FIG. 4 are cross-section views of the exposure frame assembly 12. These figures depict a sequence of motions and should be considered together.

FIG. 2 illustrates that the upper tray frame 14 is removable and that it may be detached from the lower tray frame 16. In use, the operator can readily remove the upper tray frame 14 without disturbing the lower tray frame 16 or removing the lower tray frame 16 from the photo exposure machine 10. The ability to quickly remove the upper tray frame 14 without disturbing the lower tray frame 16 is an important aspect of the invention and enhances the industrial utility of the exposure frame assembly 12. To reattach the upper tray frame 14 to the lower tray frame 16 the operator aligns the upper tray frame 14 over the lower tray frame 16 and lowers the upper tray frame 14 along assembly path 22.

Each side of the upper tray frame 14 carries a tray lift roller 24 and a tray hinge pivot roller 26. Therefore there are two tray lift rollers 24 and 25 only one of which is visible in the cross-section drawing of FIG. 4 The complimentary tray lift roller 25 is shown schematically in FIG. 5. There are also two tray hinge pivot rollers 26 and 27, only one of which is visible in the cross-section drawing of FIG. 4. The complimentary tray hinge roller 27 may be seen schematically in FIG. 5. The exposure frame assembly 12 is symmetric and the complimentary lift roller 25 and hinge pivot roller 27 components are positioned at the opposite end of the upper tray frame 14 seen in FIG. 2 through FIG. 4. The upper tray frame 14 also carries a peripheral D-shaped seal 28 which mates with the lower tray frame 16 and which is best seen in FIG. 2.

FIG. 3 depicts a work-piece 18 of exaggerated thickness for clarity of illustration, located within the exposure frame assembly 12. In general, the upper tray frame 14 defines a large rectangular optically transparent aperture which is covered by a thin polyester film which acts as a transparent support 30. The lower tray frame 16 forms a complimentary optical aperture which is covered by a sheet of glass or other material which also acts as a transparent support 32.

In FIG. 3 a vacuum has been drawn between the transparent support 30 and the transparent support 32. The vacuum causes the flexible transparent support 30 to deform which reliably clamps the work-piece 18 to the more rigid transparent support 32 and insures intimate contact between the work-piece 18 and any attached artwork.

FIG. 4 depicts movement of the upper tray frame 14 along the tray opening path 34 to permit access to the workpiece. This motion is achieved through the use of a complimentary pair of pneumatically operated rams, one of which shown as actuator ram 36. This actuator ram 36 reciprocates along ram path 44, and motion to the right in the sense of the figure moves the upper tray frame 14 along tray opening path 34 in to the open position depicted in FIG. 4. In a similar fashion motion of the actuator ram 36 along the ram path 44 from the right to the left in the sense of the figure moves the upper tray frame 14 into the closed position depicted in FIG. 3.

Figure 5:
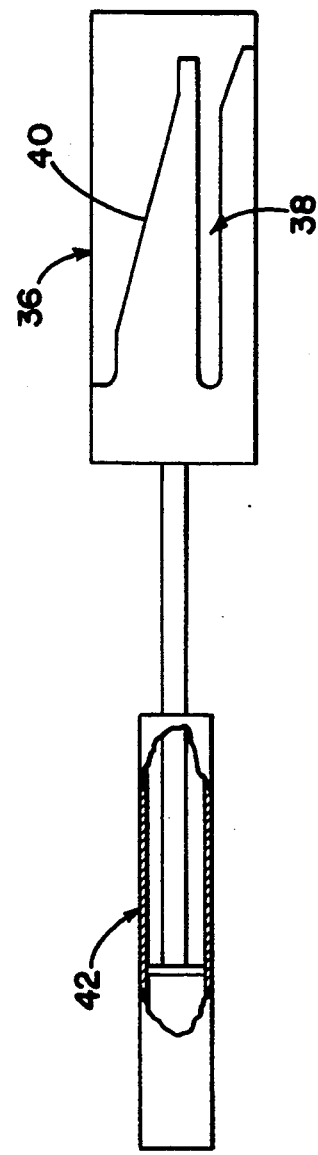
FIG. 5 is a cross-section view of a portion of the exposure frame assembly.

FIG. 5 shows the actuator ram 36 in isolation. The actuator ram 36 includes several surfaces which cooperate with the tray lift hinge pivot roller 27 and the lift roller 25. When the actuator ram 36 is fully retracted as seen in FIG. 2 the hinge pivot rollers and lift rollers can be readily lifted away from the lower tray frame 16. As the actuator ram 36 moves toward the fully extended position seen in FIG. 4 the actuator ram capture slot 38 first intercepts the tray lift hinge pivot roller 26 and 27. Next the tray lift rollers 24 and 25 encounter the actuator ram 36 lift ramp 40. This inclined surface acts as a wedge to force the upper tray frame 14 in to the open position. In general it is preferred to attach the actuator ram structures to a pneumatic cylinder 42 to supply the force necessary to open the exposure frame assembly. A pneumatic cylinder 42 is preferred since at the pressure levels required for frame opening the cylinder can be overpowered by the operator and represent a safer alternative to hydraulic cylinders and the like. In general, it is preferred to locate the pneumatic cylinder 42 in the side rails of the lower tray frame 16.

Although it is possible to use a single actuator ram 36 it is preferred to use a pair of actuator rams and associated pneumatic cylinders to minimize stresses on the upper tray frame 14.

Although an exemplary embodiment of the exposure frame assembly is disclosed herein many possible variations are contemplated within the scope of the invention which is to be interpreted by the following claims.

What is claimed is:

1. A exposure frame assembly for use with a contact and off contact photo exposure machine to expose a photosensitive work-piece, said exposure frame assembly comprising:
   an upper tray frame;
      said upper tray frame having at least one tray lift roller and said upper tray frame having at least one hinge pivot roller;
   a lower tray frame coupled to said photo exposure machine;
   at least one actuator ram coupled to said lower tray frame for capturing said hinge pivot roller and for providing opening force to said tray lift roller;
   whereby said upper tray frame moves away from said lower tray frame by rotation about a pivot axis formed by said hinge pivot roller.

2. The exposure frame assembly of claim 1 wherein said lift rollers comprise:
   a first lift roller attached to a first side of said upper tray frame and a second lift roller attached to a second side of said upper tray frame
   whereby said first lift roller and said second lift roller are laterally disposed with respect to said upper tray frame defining a lift roller axis which is adjacent one edge of said upper tray frame and which is parallel to said pivot axis.

3. The exposure frame assembly of claim 2 wherein said hinge pivot rollers comprise:
   a first hinge pivot roller attached to a first side of said upper tray frame and a second hinge pivot roller attached to a second side of said upper tray frame;
   whereby said first lift roller and said second lift roller are laterally disposed with respect to said upper tray frame defining said pivot axis which is adjacent one edge of said upper tray frame.

4. The exposure frame assembly of claim 1 wherein said actuator ram further comprises:
   an actuator ram body having a pivot capture slot for capturing said hinge pivot roller;
   an actuator ram body having a lift ramp for said lift roller;
   whereby motion of said actuator ram body toward said lift roller causes said upper tray frame to move in an arcuate path to open said exposure frame assembly.

5. The exposure frame assembly of claim 1 wherein:
   said upper exposure frame having an optical aperture, said optical aperture having a flexible transparent support spanning said optical aperture;
   said lower exposure frame having an optical aperture, said optical aperture having a rigid transparent support spanning said optical aperture;
   said flexible transparent support and said rigid transparent support together forming means for supporting said work-piece.

6. A exposure frame assembly for use with an contact and off contact photo exposure machine to expose a work-piece comprising:
   an upper tray frame;
      said upper tray frame having a pair of lift rollers attached to said upper tray frame and laterally disposed with respect to said upper tray frame;
      said upper tray frame having a pair of hinge pivot rollers attached to said upper tray frame and laterally disposed with respect to said upper tray frame adjacent said set of lift rollers;
   whereby the location of said pair of hinge pivot rollers define a hinge pivot axis;
   a lower tray frame coupled to said optical exposure machine;
   a set of actuator rams laterally disposed with respect to said upper tray frame proximate said set of lift rollers;
   each of said actuator rams having a lift ramp for engaging said lift rollers;
   whereby motion of each of said ramps toward said lift rollers causes said upper tray frame to move in an arcuate path to open said exposure frame assembly when said upper tray frame moves away from said lower tray frame by rotation about said hinge pivot axis.

* * * * *

UNITED STATES PATENT AND TRADEMARK OFFICE
CERTIFICATE OF CORRECTION

PATENT NO. : 5,365,309
DATED : November 15, 1994
INVENTOR(S) : Allen A. Lawson

It is certified that error appears in the above-indentified patent and that said Letters Patent is hereby corrected as shown below:

In column 1, line 47, please delete the word "complimentary", and insert therefor --complementary--

In column 2, line 28, please delete the word "complimentary", and insert therefor --complementary--

In column 2, line 50, please delete the word "complimentary", and insert therefor --complementary--

In column 2, line 53, please delete the word "complimentary", and insert therefor --complementary--

In column 2, line 56, please delete the word "complimentary", and insert therefor --complementary--

UNITED STATES PATENT AND TRADEMARK OFFICE
CERTIFICATE OF CORRECTION

PATENT NO. : 5,365,309
DATED : November 15, 1994
INVENTOR(S) : Allen A. Lawson

It is certified that error appears in the above-indentified patent and that said Letters Patent is hereby corrected as shown below:

In column 2, line 68, please delete the word "complimentary", and insert therefor --complementary--

In column 3, line 14, please delete the word "complimentary", and insert therefor --complementary--

In column 3, line 18, please delete the words "in to", and insert therefor --into--

In column 3, line 36, please delete the words "in to", and insert therefor --into--

In column 4, line 42, please delete "an", and insert therefor --a--

Signed and Sealed this

Twenty-fifth Day of April, 1995

Attest:

BRUCE LEHMAN

Attesting Officer

Commissioner of Patents and Trademarks